US012560470B2

(12) United States Patent
Welle et al.

(10) Patent No.: US 12,560,470 B2
(45) Date of Patent: Feb. 24, 2026

(54) MULTIDIMENSIONAL MEASURING FILL LEVEL RADAR AND METHOD

(71) Applicant: VEGA Grieshaber KG, Wolfach (DE)

(72) Inventors: Roland Welle, Hausach (DE); Joerg Boersig, Schapbach (DE); Steffen Waelde, Niedereschach (DE); Samuel Kleiser, Gengenbach (DE)

(73) Assignee: VEGA Grieshaber KG, Wolfach (DE)

( * ) Notice: Subject to any disclaimer, the term of this patent is extended or adjusted under 35 U.S.C. 154(b) by 366 days.

(21) Appl. No.: 18/006,000

(22) PCT Filed: Jul. 20, 2020

(86) PCT No.: PCT/EP2020/070477
§ 371 (c)(1),
(2) Date: Jan. 19, 2023

(87) PCT Pub. No.: WO2022/017579
PCT Pub. Date: Jan. 27, 2022

(65) Prior Publication Data
US 2023/0349745 A1      Nov. 2, 2023

(51) Int. Cl.
| | |
|---|---|
| *G01F 23/284* | (2006.01) |
| *G01S 7/03* | (2006.01) |
| *G01S 13/88* | (2006.01) |

(52) U.S. Cl.
CPC ............. *G01F 23/284* (2013.01); *G01S 7/032* (2013.01); *G01S 13/88* (2013.01)

(58) Field of Classification Search
CPC ......... G01F 23/284; G01S 7/032; G01S 13/88
See application file for complete search history.

(56) References Cited

U.S. PATENT DOCUMENTS 6,037,895 A * 3/2000 Uehara ................... G01S 7/034
                                                              342/159
10,788,351 B2 9/2020 Welle et al.
(Continued)

FOREIGN PATENT DOCUMENTS

CN        109029633 A      12/2018
CN        109520590 A * 3/2019 ........... G01F 23/284
(Continued)

OTHER PUBLICATIONS

International Search Report issued Apr. 14, 2021 in PCT/EP2020/070477 filed Jul. 20, 2020, 2 pages.
(Continued)

*Primary Examiner* — Catherine T. Rastovski
*Assistant Examiner* — Yossef Korang-Beheshti
(74) *Attorney, Agent, or Firm* — Oblon, McClelland, Maier & Neustadt, L.L.P.

(57) ABSTRACT

A multi-dimensional measuring fill level radar with a processor, a programmable logic gate, one or more radar chips and a power supply and a method of detecting a level or a topology of a surface of a product by a fill level radar including starting a processor, performing a measurement cycle, when sufficient energy has been collected, by starting a programmable logic gate and launching one or more radar chips to perform a radar measurement sequence, switching off the radar chips, calculating the topology or fill level by the programmable logic gate and/or processor when sufficient energy has been collected, switching off the programmable logic gate, and switching off the processor.

12 Claims, 4 Drawing Sheets

(56) References Cited

U.S. PATENT DOCUMENTS

| | | | |
|---|---|---|---|
| 10,948,333 B2 | 3/2021 | Welle et al. | |
| 11,326,926 B2 | 5/2022 | Welle et al. | |
| 2018/0328774 A1* | 11/2018 | Welle | G01L 9/00 |
| 2020/0333176 A1 | 10/2020 | Welle et al. | |

FOREIGN PATENT DOCUMENTS

| | | | |
|---|---|---|---|
| CN | 109632044 A | 4/2019 | |
| CN | 109632045 A | 4/2019 | |
| CN | 109632048 A | 4/2019 | |
| CN | 111183339 A | 5/2020 | |
| DE | 10 2018 207 164 A1 | 11/2018 | |
| EP | 2 199 762 A1 | 6/2010 | |
| EP | 3 401 651 A1 | 11/2018 | |
| EP | 3 467 447 B1 | 9/2019 | |
| EP | 3 467 450 B1 | 12/2020 | |
| EP | 3 719 533 B1 | 5/2022 | |
| WO | WO 2017/084701 A1 | 5/2017 | |
| WO | WO-2019068347 A1 * | 4/2019 | G01F 23/284 |
| WO | WO 2020/200768 A1 | 10/2020 | |

OTHER PUBLICATIONS

European Office Action issued Feb. 22, 2024 in European Application No. 20 743 674.2, 6 pgs.
Combined Chinese Office Action and Search Report issued Jul. 30, 2025 in Chinese Patent Application No. 202080102736.3, 11 pages.

* cited by examiner

MULTIDIMENSIONAL MEASURING FILL LEVEL RADAR AND METHOD

FIELD OF INVENTION

The present invention relates to fill level measurement and product surface topology measurement. In particular, the invention relates to a method for detecting a fill level or a topology of a surface of a product by a level radar, a multi-dimensional measuring fill level radar, a program element and a computer readable medium.

TECHNICAL BACKGROUND

Multidimensional, i.e. two- or three-dimensional measuring radar systems are used to determine fill levels or surface topologies of bulk materials. Such measuring devices can also be used in the field of process automation in the industrial environment or factory automation. Exemplary, but not exhaustive, three-dimensional measuring radar systems for the measurement of bulk material stockpiles (topology-detecting radar systems), but also multidimensional measuring microwave barriers, are mentioned here.

In the case of a topology-sensing radar system as an example of sensors from the field of process automation, there is a particular need for such a system to obtain its complete supply power from a 4 . . . 20 mA interface in order to achieve rapid market penetration. However, with devices known to date, the resulting limitations in terms of the required electrical power of an appropriately designed sensor can only be realized by using a correspondingly large energy storage device and inserting large periods of time with deactivated sensor electronics to regenerate the energy storage device.

In the case of the multi-dimensional measuring microwave barrier as an example of a sensor for factory automation, major competitive advantages always arise when this can obtain all of its energy required for operation from an IO-Link interface, via which a switching signal can also be provided to the outside in the event of a detected object in the monitoring area.

SUMMARY OF THE INVENTION

Against this background, it is an object of the present invention to reduce the energy consumption during level measurement.

This object is solved by the features of the independent patent claims. Further embodiments of the invention result from the subclaims and the following description of embodiments.

A first aspect of the present disclosure relates to a method for detecting a level and/or a topology of a surface of a filling material or bulk material by a fill level radar, for example for process automation in an industrial environment.

The processor of the fill level radar is started first, whereupon, if necessary, energy is collected in an internal energy store of the level radar. As soon as sufficient energy has been collected in the energy storage of the level radar after the processor has been started, a measuring cycle is performed. A programmable logic gate is started at the beginning of the measurement cycle. The feature "programmable logic gate" is to be interpreted broadly. For example, this is a Field Programmable Gate Array, FPGA.

The radar chips of the fill level radar are then started to perform a radar measurement sequence. As a rule, the fill level radar has several radar chips. However, only a single radar chip can be provided. At the end of the measurement cycle, the radar chip(s) is/are switched off, e.g. put into sleep mode or completely disconnected from the power supply.

This is followed by calculation of the topology of the product surface or the level or volume of the product by the programmable logic gate and/or the processor, if sufficient energy is available for this. Otherwise, energy is now collected again until the energy storage is sufficiently charged. After the calculation, the programmable logic gate is switched off or put into a sleep mode. The processor is then switched off or put into a sleep mode so that the energy store can be charged as quickly as possible.

According to one embodiment, before the programmable logic gate calculates the topology or the level, the programmable logic gate is switched off if not enough energy has been collected so far for calculating the topology of the level. Such a shutdown can also occur during the calculation process if the energy is running low.

According to one embodiment, shutting down the programmable logic gate is accomplished by opening a control line between the processor and the programmable logic gate and de-energizing the programmable logic gate.

According to another embodiment, the energy collected in the energy storage device comes entirely from a two-wire line, a three-wire line, or a battery of the level meter.

According to another embodiment, the processor is placed in a power saving mode or turned off prior to collecting energy in the energy storage device.

According to another embodiment, the programmable logic gate is a field programmable gate array, FPGA.

Another aspect of the present disclosure relates to a multi-dimensional measuring level radar which is set up and programmed to perform a method described above and below.

According to another embodiment, the multi-dimensional level radar comprises a processor, a programmable logic gate, one or more radar chips for performing a radar measurement sequence, and a power supply arranged to provide power to the processor, the programmable logic gate, and the radar chips.

According to a further embodiment, the level radar comprises one or more power supply switches arranged to selectively interrupt the power supply to the processor, the power supply to the programmable logic gate, and/or the power supply to the radar chips.

According to another embodiment, the level radar comprises one or more control line switches, arranged to selectively interrupt the control lines between the processor and the radar chips.

According to another embodiment, the level radar comprises one or more data line switches, arranged to interrupt the data lines between the radar chips and the programmable logic gate.

Another aspect of the present disclosure relates to a program element that, when executed on a processor of a multi-dimensional measuring level radar, instructs the level radar to perform the steps described above and below.

Another aspect of the present disclosure relates to a computer-readable medium on which a program element described above is stored.

Another aspect of the present disclosure relates to the use of a multi-dimensional measuring radar described above and below or a range monitoring method described above and below.

Another aspect of the present disclosure relates to the use of a multi-dimensional measuring radar described above and below, or a method described above and below, as or for a microwave barrier.

In the following, embodiments of the invention are described with reference to the figures. If the same reference signs are used in the following description of figures, these designate the same or similar elements. The illustrations in the figures are schematic and not to scale.

In the above uses, the steps of "calculating the topology or level" may be dispensable. Alternatively, a "determination of a switching signal" can be provided. Corresponding methods are known to the skilled person.

DETAILED DESCRIPTION OF EMBODIMENTS

Figure 1:
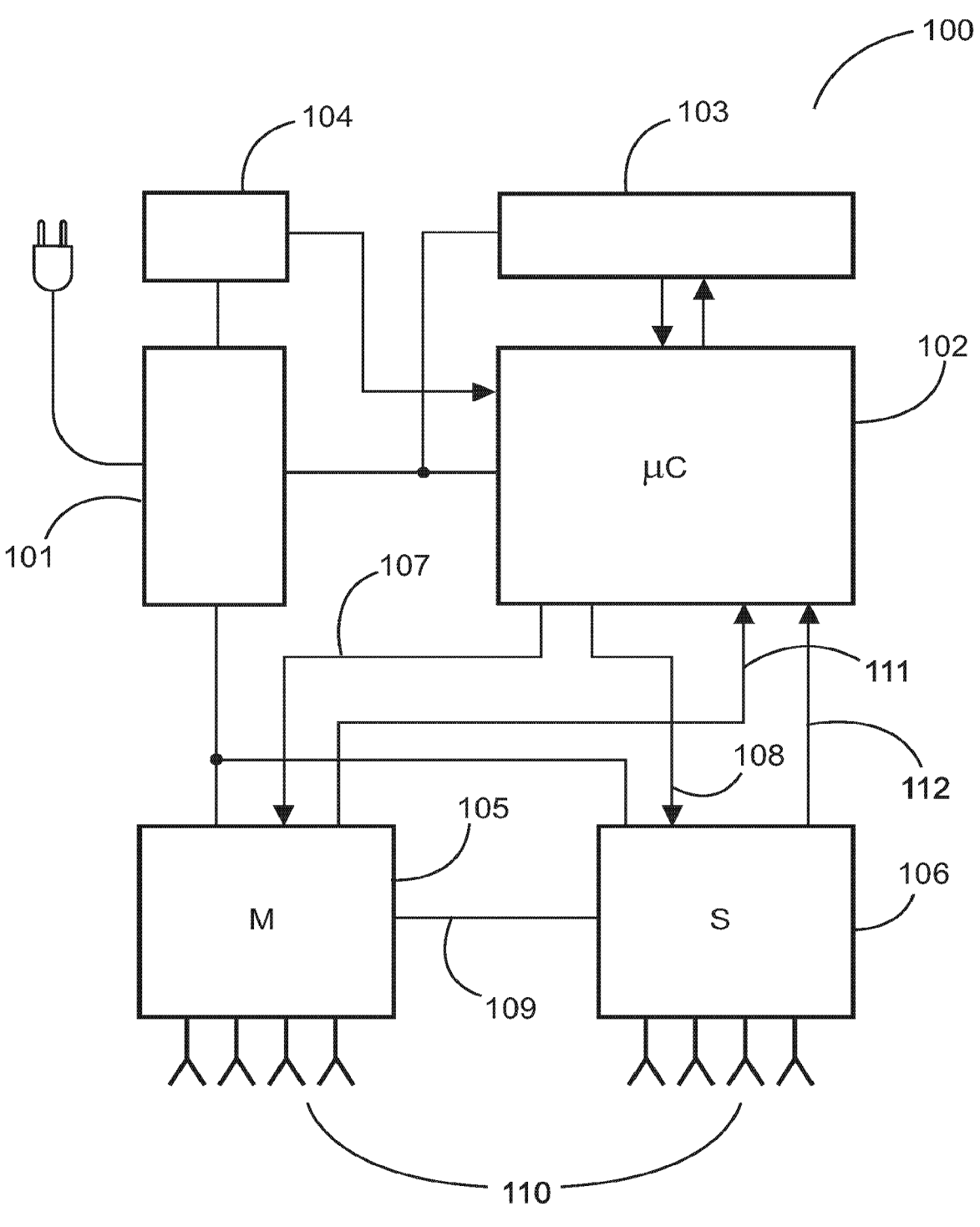
FIG. 1 shows a multi-dimensionally measuring fill level radar.

FIG. 1 shows a multi-dimensionally measuring fill level radar, which can be used in particular for process automation in an industrial environment.

The term "process automation in the industrial environment" can be understood as a subfield of technology that includes measures for the operation of machines and plants without the involvement of humans. One goal of process automation is to automate the interaction of individual components of a plant in the chemical, food, pharmaceutical, petroleum, paper, cement, shipping or mining industries. A wide range of sensors can be used for this purpose, which are adapted in particular to the specific requirements of the process industry, such as mechanical stability, insensitivity to contamination, extreme temperatures and extreme pressures. Measured values from these sensors are usually transmitted to a control room, where process parameters such as level, limit level, flow rate, pressure or density can be monitored and settings for the entire plant can be changed manually or automatically.

One subarea of process automation in the industrial environment concerns logistics automation. In the field of logistics automation, distance and angle sensors are used to automate processes inside or outside a building or within a single logistics facility. Typical applications include systems for logistics automation in the area of baggage and freight handling at airports, in the area of traffic monitoring (toll systems), in retail, parcel distribution or also in the area of building security (access control). Common to the examples listed above is that presence detection in combination with precise measurement of the size and location of an object is required by the respective application side. Sensors based on optical measurement methods using lasers, LEDs, 2D cameras or 3D cameras that measure distances according to the time-of-flight (ToF) principle can be used for this purpose.

Another sub-area of process automation in the industrial environment concerns factory/production automation. Use cases for this can be found in a wide variety of industries such as automotive manufacturing, food production, the pharmaceutical industry or generally in the field of packaging. The goal of factory automation is to automate the production of goods by machines, production lines and/or robots, i.e. to let it run without the involvement of humans. The sensors used in this process and the specific requirements with regard to measuring accuracy when detecting the position and size of an object are comparable to those in the previous example of logistics automation.

With the embodiments and processes proposed in the present disclosure, a multi-dimensional measuring arrangement can be provided for a wide variety of application scenarios, which is designed to achieve maximum energy efficiency using specific components and processes. This makes it possible to supply the complete sensor system with energy from a two- or three-wire interface. Similarly, it can be achieved that only little energy has to be stored temporarily in the sensor, which can be advantageous in particular with regard to explosion protection requirements, but also with regard to size and manufacturing costs.

In particular, a multi-dimensional measuring radar system is provided, which comprises at least one microcontroller, and a multi-channel radar system on chip (RSoC), and which is designed to draw all its power required for operation from a 2-wire interface or a 3-wire interface One-dimensionally measuring radar systems have been state of the art for many years. Especially in the field of process automation, but also in the field of factory automation or safety engineering, the correspondingly designed sensors are used to determine the distance to an object and to provide it to the outside via a 2-wire interface (4 . . . 20 mA) or a 3-wire interface (IO-Link).

In addition, recent developments in the field of automotive engineering have opened up the possibility of implementing multidimensional radar systems for automation applications. The basis for this are the radar systems on chip (RSoC), which have been available for some time and provide a large number of hardware components for the realization of several transmit channels and several receive channels for radar signals including the necessary digital control circuits on a single chip.

With multi-dimensionally measuring radar systems, it is possible not only to determine the distance to an object, but also to precisely detect its position in space. FIG. 1 shows a first example of a multi-dimensional measuring radar system 100. The components of the system are supplied with power via a power supply unit 101, which can draw sufficient power, for example from a vehicle electrical system 102. A specialized microprocessor 102 can apply drive signals to up to two RSoC devices 105, 106 via SPI interfaces 107, 108. The radar devices 105, 106 are connected in a master-slave configuration, and synchronize with each other via at least one high-frequency synchronization line 109, so that in sum a plurality of transmitting and/or receiving antennas 110 can be driven. Signals received by the devices 105, 106 via the antennas 110 are transmitted in digitized form to the processor 102 at appropriately configured high-speed synchronous interfaces 111, 112. The processor has specialized inputs to read the signals 111, 112. In particular, LVDS interfaces or CSI-2 interfaces are used for this purpose. The processor is further designed to implement the processing of the radar signals, in particular by digital beamforming, via correspondingly powerful computing units, and to determine the position of individual reflectors in space and to make it available to the outside. A non-volatile memory 104, in which the program logic of the processor 102 is stored, and a volatile memory 103, for example a DDR2, DDR3 or DDR4 memory, which permits fast memory accesses via its interfaces, play a supporting role here. The components of the system are continuously powered after startup. Using the application-optimized processor 102, up to two radar components can be integrated into a system and evaluated, while still requiring a large amount of power to perform a measurement.

Figure 2:
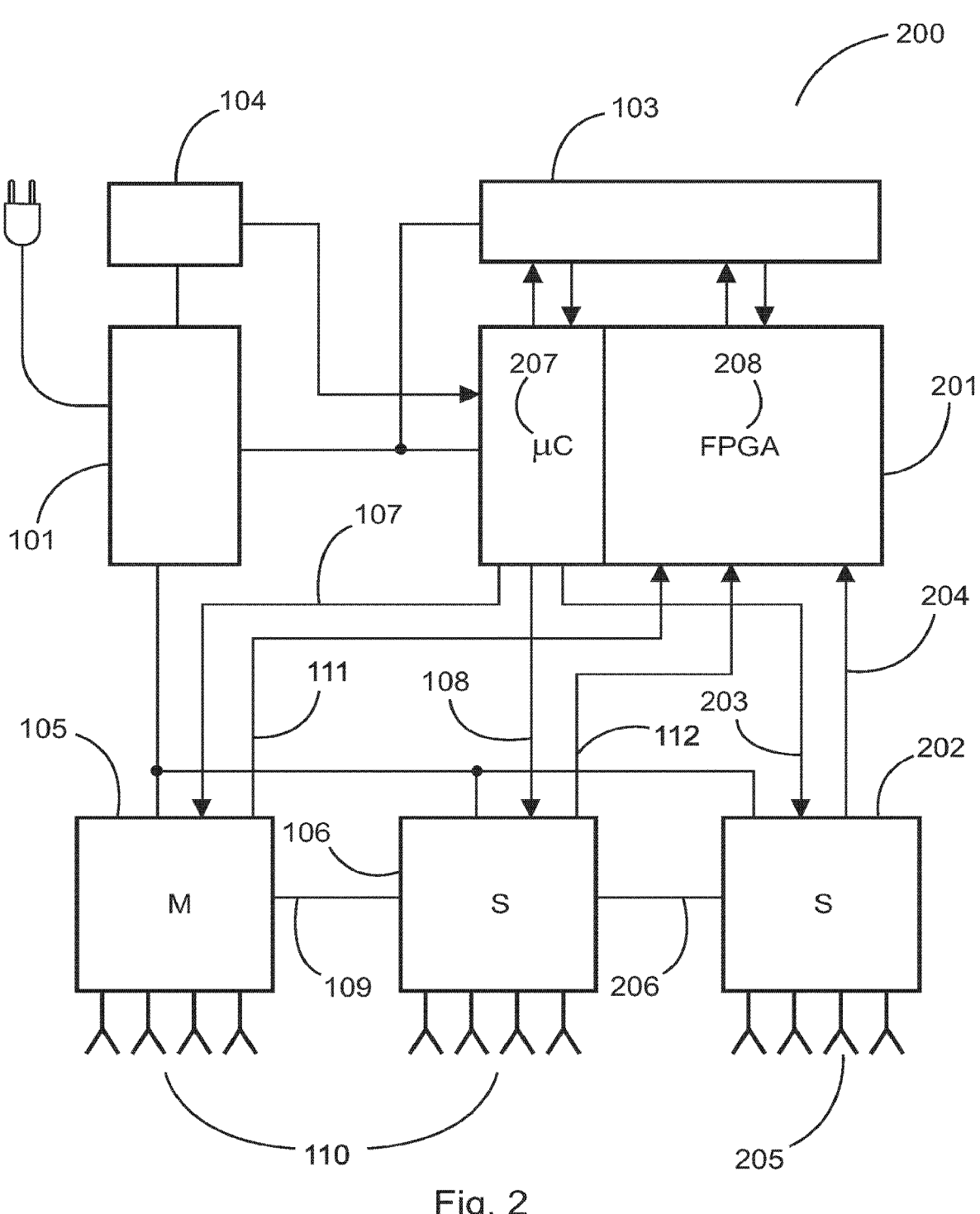
FIG. 2 shows another multi-dimensionally measuring fill level radar.

For many applications in the field of process automation or factory automation, it is necessary to massively improve the imaging quality of the radar system compared to that of the arrangement of FIG. 1. For example, the number of radar chips (RSoC) can be increased. FIG. 2 shows a corresponding example. By introducing an additional radar chip 202, which acts as a second slave, and an associated increase in the number of transmitting and/or receiving antennas 110, 205, the resolution of the radar system and thus the accuracy in determining the spatial position of a reflector is improved. The additional radar chip is synchronized with the previous RSoC's 105, 106 via another synchronization line 206. No specialized processor 102 exists for the expanded array 105, 106, 202 of radar chips, so such systems are typically evaluated using a so-called system on chip (SoC), which is characterized by integrating a generic processor 207 and a freely programmable FPGA 208 in one chip. With the help of the FPGA part 208, fast digital interfaces for the signals 111, 112, 204 of the radar chips can be implemented in particular. Furthermore, a large part of the calculations for digital beamforming can also be implemented in the FPGA 208 of the SoC 201. Compared to the arrangement 100, the arrangement 200 is characterized by a higher quality of the radar measurement, but, due to the use of an additional RSoC 202 and the SoC 201 for the evaluation of the signals, it requires considerably more energy during an execution of a measurement, and thus, compared to the solution realized with the arrangement of FIG. 1, it moves even further away from the goal of providing multidimensional radar systems that obtain all their supply power from a two-wire or a three-wire interface.

Figure 3:
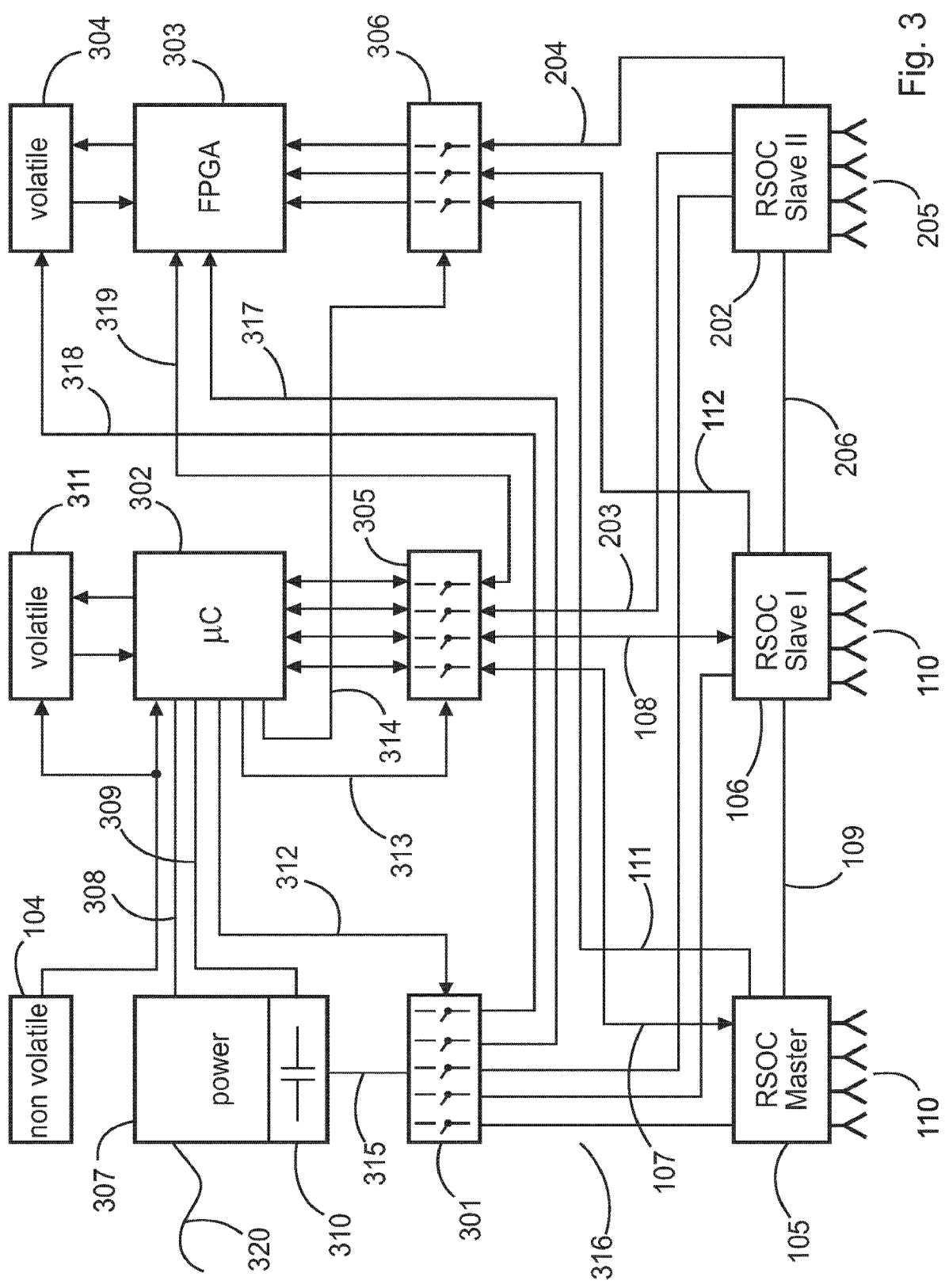
FIG. 3 shows another multi-dimensionally measuring fill level radar.

FIG. 3 shows a further embodiment. A core aspect is to provide an extremely energy-saving microprocessor 302, which controls the timing of a measurement, and for this purpose is permanently supplied with energy by the power supply unit 307 via a supply line 308.

A control program is persistently stored in a non-volatile memory 104, and can be loaded and executed in the processor 302 and/or the volatile memory 311 connected to the processor 302 when the system is turned on. The control processor 302 is connected to the power supply 307 via a signaling line 309, through which it can read and monitor, in particular, the state of charge of an energy storage device 310, such as a capacitor or battery, integrated in the power supply 307. Furthermore, essential components for setting up a level radar 300 are the voltage supply switches 301, the control line switches 305 and the data line switches 306, which allow the processor 302, via the switching signals 312, 313, 314, to specifically switch on and specifically switch off again individual components of the system during a measurement sequence. For example, the voltage supply switches 301 can be used to selectively pass supply voltage 315 via the lines 316 to the components 105, 106, 202, 303, 304, with the result that the corresponding components can be transferred to the operational state. Furthermore, it is possible to selectively interrupt the supply to individual components 105, 106, 202, 303, 304 again, which immediately reduces the energy consumption of the respective units to zero. During a period of supply of electrical energy, the RSoC's 105, 106, 202 can be supplied with control signals by the processor in a known manner via the control lines 107, 108, 203 and, in particular, can be set and parameterized. During a period of no electrical power, the electrical behavior of the RSoC's 105, 106, 202 cannot be predicted with respect to the control lines 107, 108, 203, since such an operating mode was not envisaged during the development of the devices. To ensure compliant operation, the connections of the control signals 107, 108, 203 towards the processor 302 can be closed or opened in a defined manner using the control line switches 305 individually or collectively. Furthermore, the level radar 300 has an FPGA 303 together with associated working memory 304, which can be supplied with electrical energy from the power supply unit 307 via the supply lines 317, 318 and the voltage supply switch 301. The FPGA 303 can be signal-connected to the processor 302 via the control line 319 and the control line switch 305 after supply energy has been applied. Once activated, the processor 302 can transfer the FPGA 303 to an operational state via the control line 319, in particular by transmitting a binary programming sequence (bitstream). Once the FPGA 303 has been programmed and the RSoC's 105, 106, 202 have been commissioned and parameterized, the data lines 111, 112, 204 of the RSoC's can be connected to the correspondingly preconfigured input pins of the FPGA 303 via the data line switch 306. At the same time, it is possible, after measurement has been performed, to ensure that the data lines 111, 112, 204 are interrupted in advance and, in particular, that the corresponding input pins of the FPGA 303 are set to a high-impedance state before the RSoC's 105, 106, 202 are switched off by driving 314 the processor 302.

It should be noted at this point that all of the switches 301, 305, 306 shown in FIG. 3 may have a plurality of individual switching elements via which a plurality of actually existing numbers of electrically necessary line connections can be closed and/or opened, depending on the respective signal technology. For example, the control lines 107, 108, 203, 319 may be SPI, QSPI or IIC technology, which may comprise, for example, a transmit line, a receive line, a chip select and/or a clock line. The representation of a single line 107, 108, 203, 319 may mean, in technical implementation, the introduction of a plurality of electrical lines. Corresponding considerations also apply to the signal lines 111, 112, 204. Furthermore, it should be noted that a "closing" of a switch element within the switches 301, 305, 306 may mean an establishment of an electrical connection or may also mean an activation of a driver circuit or a level converter. Furthermore, an "opening" of a switch element within the switches 301, 305, 306 can mean a disconnection of an electrical connection or but also a deactivation of a driver circuit or a level converter or but also a switching to a high impedance state. In this way, it can be prevented that undefined cross currents, which negatively influence the energy consumption, can flow from an activated component 302, 303 to a deactivated component 105, 106, 202.

As described at the beginning, highly integrated components are used for the radar components 105, 106, 202, which were developed in particular for applications in non-power-limited applications. With the help of the switches 301, 305, 306, the power requirement of the components 105, 106, 202 can be reduced to zero whenever they are not needed in the respective phase of a measurement sequence. Depending on the component, it can also be provided temporarily or alternatively to transfer the RSoCs 105, 106, 202 into an energy-saving stand-by mode during an inactive phase by introducing corresponding control commands via the control lines 107, 108, 203, in which in particular the high-frequency circuits of the RSoCs 105, 106, 202 are deactivated, but settings and parameterizations made in correspondingly provided digital circuits are retained.

The control processor 302 coordinates and controls the entire measurement sequence of the level radar 300, and consequently can never be completely turned off during operation of the arrangement 300. At this point, very low power processor technologies are used, which can support multi-layered power saving measures through sophisticated power down modes. Such processors have been available on the market for some time, especially for applications in the field of battery-powered products. Well-known technologies such as Flash, FRAM or EEPROM devices are used as program memory 104. The main memory 311 of the processor 302 may be implemented as SRAM, FRAM, DRAM or also as Hyper RAM. It may be provided that the program memory 104 and/or the main memory 311 is partially and/or completely integrated in the processor 302.

The FPGA 303 is used to take into account the special requirements when setting up multidimensional radars for automation technology with regard to the evaluation of a large number of RSoC's 105, 106, 202 and with regard to the required computer architecture for efficient calculation of the evaluation steps for the radar signals. At this point, classical SRAM based FPGA's can be used, which according to the embodiment example of FIG. 3 have to be reconfigured with a binary programming sequence (bitstream) after any connection to a supply voltage 317 from the outside via a control line 319, for example a synchronous control line 319 such as SPI or QSPI. However, integrated SRAM based FPGA's with a flash memory integrated in the package can also be used. In this case, configuring the FPGA via the control line 319 can be dispensable, since appropriately pre-programmed FPGAs independently load the configuration data from the flash memory directly after connection to an operating voltage 317. However, a disadvantage of SRAM-based FPGA's is that they cause extremely high peak values of the required current on the supply line 317 during configuration, which can complicate the implementation of the power supply 307. In addition, this configuration must be rewritten each time the FPGA is started, which may result in additional power consumption. In a particularly advantageous embodiment, it may therefore be envisaged to provide non-volatile FPGA technologies 303. These are built on the basis of flash technology, and in the context of the present invention offer the particular advantage of not losing the configured bitstream logic after one-time configuration at the factory or during an initial start-up. Consequently, rewriting a binary programming sequence (bitstream) can be omitted during operation. In addition, calculations in the FPGA can be interrupted at any point, since the memory contents are also persistently retained after the supply voltage 317 is switched off. Thus it is possible to deactivate the FPGA between the individual steps of an extensive calculation in order to collect energy again.

It can also be intended to use derivatives instead of the previously mentioned FPGA technologies, which in contrast to the flash-based FPGAs can only be programmed once, but like these are then immediately ready for operation without upstream booting after applying a supply voltage. A family often used for this purpose are the so-called antifuse FPGAs.

In the event that the memory implemented in the FPGA is not sufficient, an external main memory 304 can be provided, which can also be switched off via the supply line 318. In particular, DRAMs (DDR1, DDR2, DDR3, DDR4) or energy-saving low-power derivatives such as LP_DDR2 or LP_DDR4 are used here as memory. Alternatively, lower-power components such as SRAMs or Hyper RAMs can also be used. In a particularly advantageous embodiment, ferroelectric RAMs (FRAM) are used here. These are characterized by permanently retaining the memory contents even after deactivation of the voltage supply 318 without electrical energy. In conjunction with the flash FPGA described above, this results in a unit of FPGA and FRAM which can be de-energized at any point in a computation, for example, to collect energy in the power supply 307 before a further step of an extensive computation can be started after the FPGA and FRAM have been re-energized.

Figure 4:
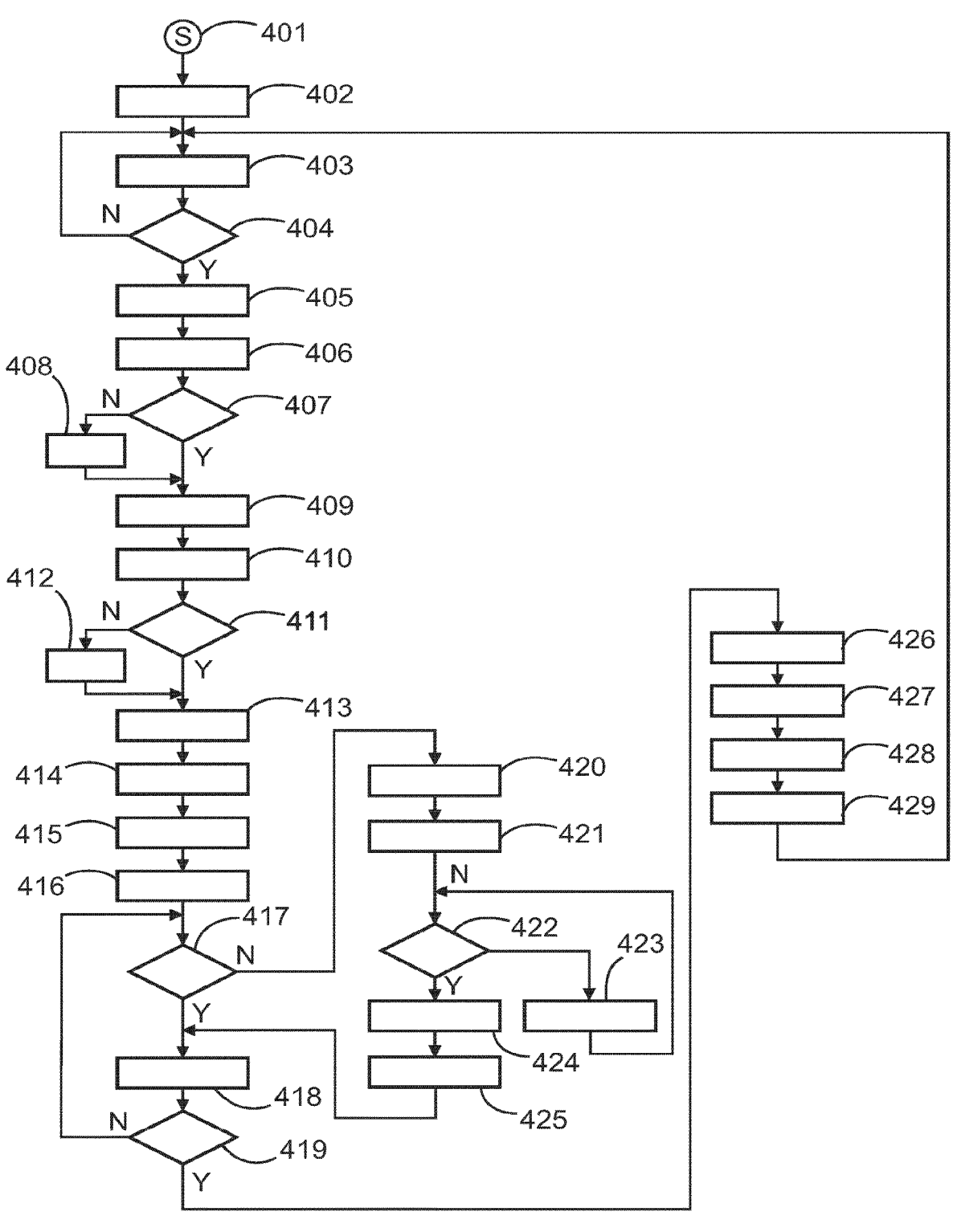
FIG. 4 shows a flow diagram of a process.

FIG. 4 shows an example of a particularly advantageous sequence for implementing a measurement cycle in a sensor 300 by means of a flowchart. The process begins in the start state 401. In step 402, the processor 302 is first started. In step 403, energy is collected in the energy storage 310 for a defined time, for example by activating an energy saving mode of the processor 302. The energy comes entirely from a two-wire line 320 or a three-wire line 320, for example a 4 . . . 20 mA loop 320 or an IO-Link interface 320. The energy can also be drawn entirely from a battery (not shown) installed in the level radar 300. In step 404, a check is made to determine if sufficient energy is available to start a measurement cycle. The connection 309 can be used for this purpose. If a measurement cycle can be started, in step 405 the FPGA 303 with associated peripherals 304 is started by supplying power 317, 318. In step 406, the control line 319, for example a synchronous serial interface such as SPI or QSPI, is connected to the FPGA. This line can be used in step 407 to check whether the FPGA is already preconfigured. If this is not the case, in step 408 the FPGA 303 is configured by writing a binary programming sequence (bitstream). In step 409, control lines 107, 108, 203 are connected to the radar chips. In step 410, the radar chips 105, 106, 202 are activated, for example by establishing a connection 301 on the supply lines 316 or else by sending a drive command via the control lines 107, 108, 203, which transfers the radar chips from the energy-saving state to the working state. In the subsequent step 411, it is checked whether the radar chips are already configured. If this is not the case, a binary sequence for configuring the RSoC's 105, 106, 202 is written in step 412 using the control lines 107, 108, 203. Once configured, in step 413 the data lines 111, 112, 204, for example synchronous differential lines according to the LVDS standard or the CSI-2 standard, are connected to the FPGA 303 via the switch 306. In step 414, a radar measurement sequence is triggered in the radar chips via control lines 107, 108, 203. During the execution of this sequence, reflectance data is acquired and transferred to the FPGA 303 and/or the memory 304. After completion of the radar measurement sequence, in step 415 the data lines 111, 112, 204 and possibly the control lines 107, 108, 203 to the radar chips are disconnected again before in step 416 the RSoC's 105, 106, 202 are deactivated or switched off again to save energy.

It should be noted at this point that data acquisition requires parallel operation of multiple radar chips, and consumes much of the power during an entire measurement cycle. Therefore, it may be intended to activate the radar chips 105, 106, 202 only as briefly as possible.

In step 417, it is checked whether there is sufficient power to start the calculations for evaluating the radar signals. If this is not the case, the control line 319 is disconnected in step 420 before both the FPGA 303 and its memory 304 are de-energized in step 420 by disconnecting the connections 317, 318. Since the data in both the flash FPGA 303 and the FRAM 304 are persistently retained even without a power supply, a maximum amount of power can be saved in this way. In step 422, it is checked whether there is now sufficient energy to evaluate the radar data. If this is not the case, energy is further collected in step 423. If not, power is again applied to the supply 317, 318 in step 424, and the control line 319 is reconnected in step 425. Thus, it is possible to switch to step 418, in which the next, pending and pre- defined package of radar signal processing steps is processed in the FPGA 303. Since this has specialized digital comput- ing structures for this purpose in accordance with the invention, this can proceed very efficiently and quickly. In step 419, the processor 302 checks whether all the required radar signal processing work packages have been processed. If this is the case, in step 426 the result of the FPGA calculation is transmitted to the processor 302 via the control line 319, which allows bidirectional communication, before in step 427 the FPGA 303 and its working memory 304 are de-energized again by disconnecting the lines 317, 318, 319. In step 428, the processor transmits the results of the measurement to a higher-level device, for example via the 4 . . . 20 mA line 320 or the IO-Link line 320 or a radio interface not shown. In step 429, the processor switches to its energy saving mode, whereby the total energy consump- tion of the system 300 is reduced to an absolute minimum again.

It should be additionally noted that a "shutdown" of a module or an assembly can also be a "deactivation" of a module or an assembly with the aim of reducing the required power.

Further, it should be noted that the switching elements 305 may also be integrated into the processor 302. It may also be provided that the switching elements 306 may be integrated or implemented in the FPGA. It may also be provided that the memory 304 may be integrated in the FPGA. The FPGA 303 may also be a system on chip.

It is a core aspect of one embodiment to provide several power domains in a radar system that are activated for different periods of time. It can also be considered an aspect to combine specialized hardware components in such a way that these interact due to their structure and/or due to the respective task in the system in such a way that an extremely energy-saving system is realized in the overall result. In this way, the energy storage 310 can be kept small. In addition, only a minimum amount of energy is then consumed per measurement cycle, which, given an existing maximum energy budget of an interface 320 or a battery, leads to maximizing the measurement repetition rate of the overall system and/or the service life of a battery.

Supplementally, it should be noted that "comprising" and "having" do not exclude other elements or steps, and the indefinite articles "a" or "an" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. A method of detecting a level or a topology of a surface of a product by a fill level radar, comprising:
starting a processor;
performing a measurement cycle, when sufficient energy has been collected, by starting a programmable logic gate and launching one or more radar chips to perform a radar measurement sequence;
switching off the radar chips;
switching off the programmable logic gate if not enough energy has been collected so far for calcu- lating the topology or the level;

calculating the topology or fill level by the program- mable logic gate and/or processor when sufficient energy has been collected;
switching off the programmable logic gate; and
switching off the processor,
wherein the switching off the programmable logic gate further comprises opening a control line between the processor and the programmable logic gate and de- energizing the programmable logic gate.

2. The method according to claim 1, wherein the energy collected in an energy storage device is entirely from a two-wire line, a three-wire line, or a battery of a level radar.

3. The method according to claim 1, wherein the proces- sor is placed in a power saving mode or switched off prior to collecting power in an energy storage device.

4. The method according to claim 1, wherein the pro- grammable logic gate is a field programmable gate array (FPGA).

5. A multi-dimensionally measuring fill level radar for detecting a level or a topology of a surface of a product, comprising:
a processor;
a programmable logic gate;
one or more radar chips configured to perform a radar measurement sequence; and
a power supply configured to supply power to the pro- cessor, the programmable logic gate and the radar chips;
a data line switch configured to interrupt the data lines between the radar chips and the programmable logic gate,
wherein the processor is further configured to start and perform a measurement cycle, when sufficient energy has been collected, by being further configured to start the programmable logic gate and launch one or more radar chips to perform a radar measurement sequence,
wherein the processor is further configured to switch off the radar chips, calculate the topology or fill level when sufficient energy has been collected or instruct the programmable logic gate to calculate the topology or fill level when sufficient energy has been collected, switch off the programmable logic gate, and thereafter be switched off.

6. The multi-dimensionally measuring fill level radar according to claim 5, comprising:
a power supply switch configured to selectively interrupt power to the processor, programmable logic gate, and radar chips.

7. The multi-dimensionally measuring fill level radar according to claim 5, comprising:
a control line switch configured to interrupt the control lines between the processor and the radar chips.

8. A non-transitory computer readable medium having stored thereon a program element that, when executed by a processor of a multi-dimensional measuring fill level radar instructs the fill level radar to implement a method of detecting a level or a topology of a surface of a product by a fill level radar, comprising:
starting a processor;
collecting energy in an energy storage device;
performing a measurement cycle, when sufficient energy has been collected, by:
starting a programmable logic gate and launching one or more radar chips to perform a radar measurement sequence;
switching off the radar chips;

switching off the programmable logic gate if not enough energy has been collected so far for calculating the topology or the level;

calculating the topology or fill level by the programmable logic gate and/or processor when sufficient energy has been collected;

switching off the programmable logic gate; and switching off the processor, wherein the switching off the programmable logic gate further comprises opening a control line between the processor and the programmable logic gate and de-energizing the programmable logic gate.

9. The method according to claim 1, wherein the energy collected in an energy storage device is entirely from a two-wire line, a three-wire line, or a battery of a level meter.

10. The method according to claim 2, wherein the processor is placed in a power saving mode or switched off prior to collecting power in the energy storage device.

11. The method according to claim 2, wherein the programmable logic gate is a field programmable gate array (FPGA).

12. The method according to claim 3, wherein the programmable logic gate is a field programmable gate array (FPGA).

\* \* \* \* \*